Feb. 6, 1962 C. H. BLACKERBY 3,019,973
SLIDE RULE
Filed Jan. 21, 1960
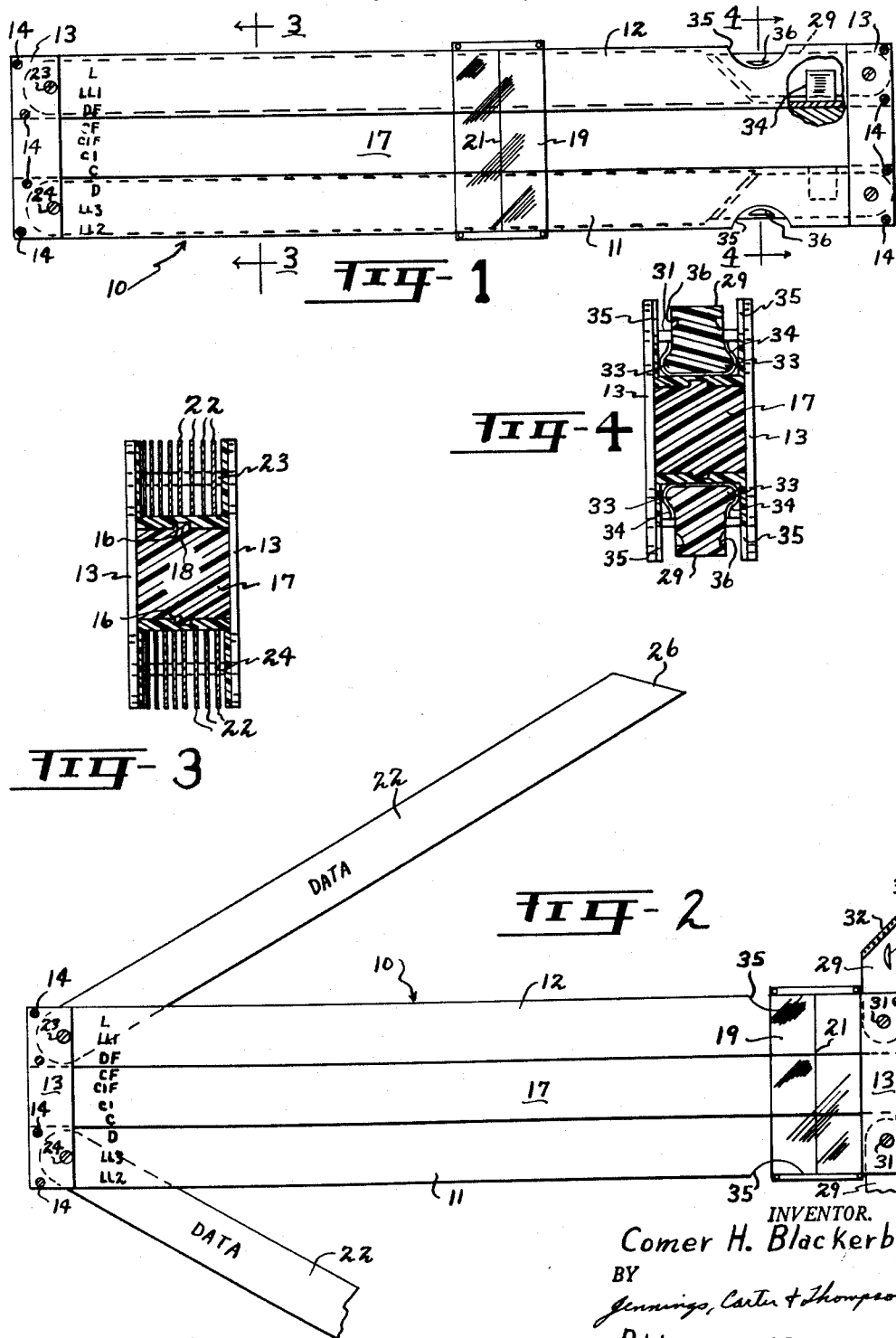
INVENTOR.
Comer H. Blackerby
BY
Jennings, Carter & Thompson
Attorneys

# United States Patent Office 3,019,973
Patented Feb. 6, 1962

3,019,973
SLIDE RULE
Comer H. Blackerby, 1101 Government St., Apt. 1A, Mobile, Ala.
Filed Jan. 21, 1960, Ser. No. 3,875
2 Claims. (Cl. 235—70)

This invention relates to slide rules and more particularly to a slide rule having a plurality of indicia bearing members mounted thereon for selective swinging movement toward and away from the body of the slide rule.

Heretofore, in the use of a slide rule, if additional data concerning science formulas, conversion factors, design constants, tables, instructions, etc., were desired, it was necessary to refer to a reference book or other material to obtain the information.

By the present invention, indicia bearing members or leaves having the above mentioned data are pivotally mounted on a slide rule and at least one of the body members of a slide rule is adapted to receive the indicia bearing members. Releasable means are provided on the slide rule to retain the indicia carrying members in inoperable position.

It is an object of the present invention to provide a slide rule having at least one generally U-shaped body portion to receive a plurality of indicia carrying members or leaves therein which are adapted for movement between operable and inoperable positions.

A further object is to provide a slide rule having indicia carrying leaves pivotally mounted on the slide rule at one end thereof and having free inner ends adapted to swing in and out of the U-shaped body portion with means to retain, selectively, the free ends of the leaves within the U-shaped body portion.

Apparatus embodying features of my invention is shown in the accompanying drawing, forming a part of this application, in which:

FIG. 1 is a side elevational view of a slide rule embodying my invention, partly broken away and in section, and showing the indicia carrying members in inoperable position;

FIG. 2 is a side elevational view of my slide rule partly broken away and showing the indicia carrying members in operable position and available for use by the operator of the slide rule;

FIG. 3 is a sectional view taken generally along the line 3—3 of FIG. 1; and

FIG. 4 is a sectional view taken generally along the line 4—4 of FIG. 1 and showing the means for retaining the indicia carrying members in inoperable position.

Referring to the drawings, a slide rule is indicated generally by the numeral 10 and comprises a pair of stationary body portions 11 and 12. Body portions 11 and 12 are secured to each other at their ends by connecting members 13. Suitable screws 14 secure connecting members 13 to body portions 11 and 12. Body portions 11 and 12 are generally U-shaped, as viewed in cross section, with the open part of the U facing outwardly of slide rule 10. A groove or guideway 16 is formed on the inner surface of each of body portions 11 and 12.

A slide 17 is slidably positioned between body portions 11 and 12 and is provided with tongues 18 which ride in the grooves 16 whereby slide 17 is adapted for sliding movement relative to body portions 11 and 12. A cursor 19 is positioned over body portions 11 and 12 and is adapted to slide therealong. Cursor 19 has a hairline 21 thereon which is adapted for positioning over selected numerals on slide rule 10.

A plurality of indicia carrying members or leaves 22 are pivotally mounted by pins 23 and 24 to body portions 11 and 12, respectively. Leaves 22 may preferably be formed of a thin metal or plastic material. While some of leaves 22 would have machine inscribed data thereon, some would be provided with a surface covering sufficient to permit data to be inscribed thereon by hand. The free ends of the leaves 22 are slanted at 26 so that the leaves 22 may be easily retained within the U-shaped body portions 11 and 12.

Means to retain leaves 22 in inoperable position are provided comprising retaining blocks 29 pivotally mounted by pins 31 for pivoting toward and away from the body portions 11 and 12. The inner free end of blocks 29 are slanted to complement the sloping ends 26 of leaves 22. A strip of resilient material 32, such as rubber or felt, is formed on the free end of each block 29 to engage the slanted ends 26 of leaves 22. To hold blocks 29 in position, outwardly extending protuberances 33 are formed thereon which fit in a spring clip member 34. That is, the blocks 29 are held in engagement with ends 26 when the leaves 22 are positioned within the U-shaped body portions 11 and 12 by the engagement of the protuberances 33 with the clip members 34. Blocks 29 may be easily disengaged by a user from engagement with spring clip members 34 by the insertion of fingers through notches 35 in body portion 11 and grasping block 29 at recesses 36 therein.

In operation, with leaves 22 in inoperable position as shown in FIG. 1 and assuming a desired indicia bearing leaf 22 to be within body portion 12, block 29 thereon is moved upwardly to the position shown in FIG. 2. The cursor 19 is then moved to the position shown in FIG. 2 and leaves 22 are removed by gravity from slide rule 10. The desired leaf 22 is grasped and the remaining leaves may be returned to the U-shaped body portions. If desired the cursor 19 may be positioned over leaves 22 to retain the leaves in the body portions. After the data has been obtained from leaf 22, the leaf may again be positioned within the body portion 12 and block 29 may be moved downwardly to the position shown in FIG. 1 to retain leaves 22 in inoperable position.

From the foregoing, it is understood that I have provided indicia bearing members or leaves having desired data thereon which leaves are pivotally mounted on a slide rule with at least one of the body members of the slide rule adapted to receive the indicia bearing members. Means are provided also to retain, selectively, the indicia carrying members in inoperable position. Thus, formulas, conversion factors, tables, etc., may be mounted directly on a slide rule for access thereto without the necessity of referring to a separate reference.

While I have shown my invention in but one form, it will be obvious to those skilled in the art that it is not so limited but is susceptible of various changes and modifications without departing from the spirit thereof, and I desire, therefore, that only such limitations shall be placed thereupon as are specifically set forth in the appended claims.

What I claim is:
1. In a slide rule, a pair of spaced body portions secured to each other and forming a guideway therebetween, a slide in the guideway between the body portions and adapted to slide relatively to said body portions, at least one of said body portions being U-shaped as viewed in cross section with the open sides thereof facing outwardly of the slide rule, a plurality of indicia bearing leaves pivotally mounted at one end to said one U-shaped body portion and having free inner ends adapted to swing in and out of said one body portion, the free ends of said leaves being slanted, and retaining means pivotally mounted adjacent the free ends of the leaves and having slanted surfaces thereon which com- plement the slanted free ends of said leaves to engage and retain, selectively, said free ends within said one U-shaped body portion.

2. In a slide rule, a pair of spaced body portions secured to each other and forming a guideway therebetween, a slide in the guideway between the body portions and adapted to slide relatively to said body portions, at least one of said body portions being U-shaped as viewed in cross section with the open side thereof facing outwardly of the slide rule, a plurality of indicia bearing leaves pivotally mounted at one end to said one U-shaped body portion and having free inner ends adapted to swing in and out of said one body portion, retaining means pivotally mounted adjacent the free ends of the leaves to retain, selectively, said free ends within said one U-shaped body portion, and releasable resilient catch means mounted within said one U-shaped body portion in position to receive and hold said retaining means, the free ends of said leaves being slanted to engage said retaining means when said retaining means is caught by said catch means.

References Cited in the file of this patent

UNITED STATES PATENTS

| | | |
|---|---|---|
| 987,703 | Curtin | Mar. 28, 1911 |
| 1,015,877 | Mouchel | Jan. 30, 1912 |
| 2,369,819 | Dietzgen | Oct. 30, 1943 |

FOREIGN PATENTS

| | | |
|---|---|---|
| 52,722 | Norway | June 26, 1933 |